3,799,892
BENZOXEPIN-3-ONES AND BENZODIOXEPIN-3-ONES AS PERFUME ODORANTS

John J. Berreboom, Old Lyme, Donald P. Cameron, New London, and Charles R. Stephens, Jr., East Lyme, Conn., assignors to Pfizer Inc., New York, N.Y.
No Drawing. Application Oct. 28, 1969, Ser. No. 2,058, now Patent No. 3,647,479, which is a division of application Ser. No. 572,206, Aug. 15, 1966, now Patent No. 3,517,031. Divided and this application Oct. 19, 1971, Ser. No. 190,663

Int. Cl. C11b 9/00
U.S. Cl. 252—522                          4 Claims

ABSTRACT OF THE DISCLOSURE

Benzoxepin-3-ones and benzodioxepin-3-ones, prepared by a novel synthesis, are useful as odorant agents for perfumes to impart a watermelonlike odor.

---

This application is a division of copending application Ser. No. 2,058, filed Oct. 28, 1969 now U.S. Pat. No. 3,647,479 which in turn was a divisional application of then copending application Ser. No. 572,206, filed Aug. 15, 1966, now U.S. Pat. No. 3,517,031.

Among the objects of this invention are to provide novel compounds which impart a fresh, leafy or green taste to foods and a pleasant, leafy odor to perfumes as well as to foods. The odor and taste are reminiscent of melons. Another object is to provide a method for the preparation of these compounds from compounds which are known to those familiar with the art.

Broadly, this invention relates to compounds of the formula:

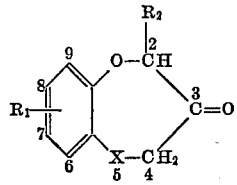

where $R_1$ and $R_2$ are each selected from hydrogen and alkyl having from 1 to 4 carbon atoms and X is oxygen or methylene. This invention also relates to valuable intermediates of the formula:

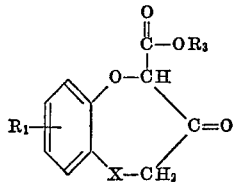

where $R_1$ and X are as aforesaid and $R_3$ is alkyl having from 1 to 4 carbon atoms. This invention further includes processes for the preparation of these compounds from known materials of the formulas:

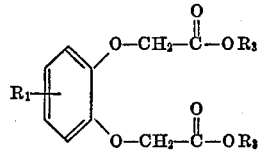

and

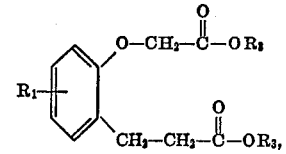

by a novel process. The compouds of the formula:

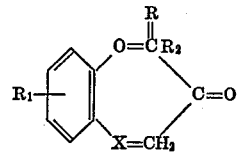

where $R_1$, $R_2$ and X are as aforesaid are useful as flavor and odor agents for edibles and as odor agents for perfumes and cosmetics. Compounds of the formula:

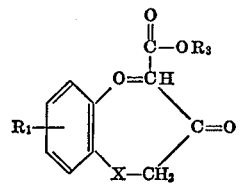

are valuable intermediates and are also useful as chelating agents.

The valuable benzodioxepin compounds of this invention are prepared from substituted and unsubstituted catechol-O,O-diacetic acid esters which in turn are prepared according to the procedure of W. Carter and W. Trevor Lawrence, J. Chem. Soc., vol. 77, page 1222 (1900). The benzoxepin compounds of this invention are prepared from the corresponding 2-carbalkoxymethyl-phenoxyacetic acid esters which in turn are prepared from 2-hydroxy-phenoxyacetic acid esters by the procedure of Carter and Lawrence. These compounds are reacted in accordance with the following reaction scheme:

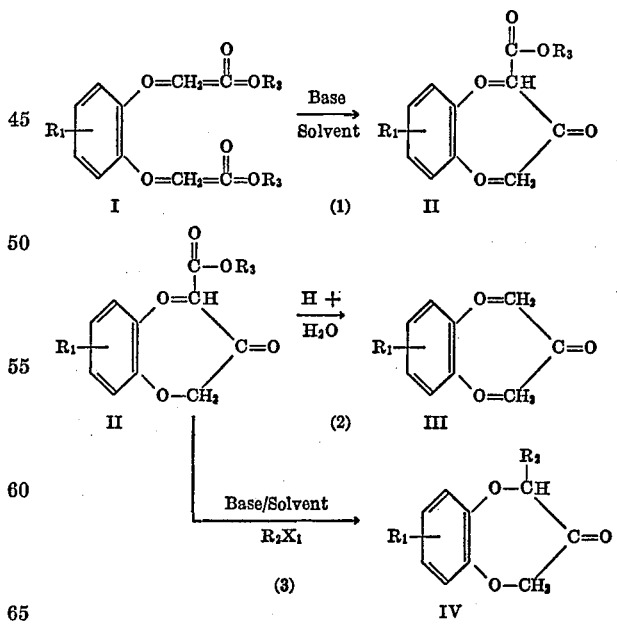

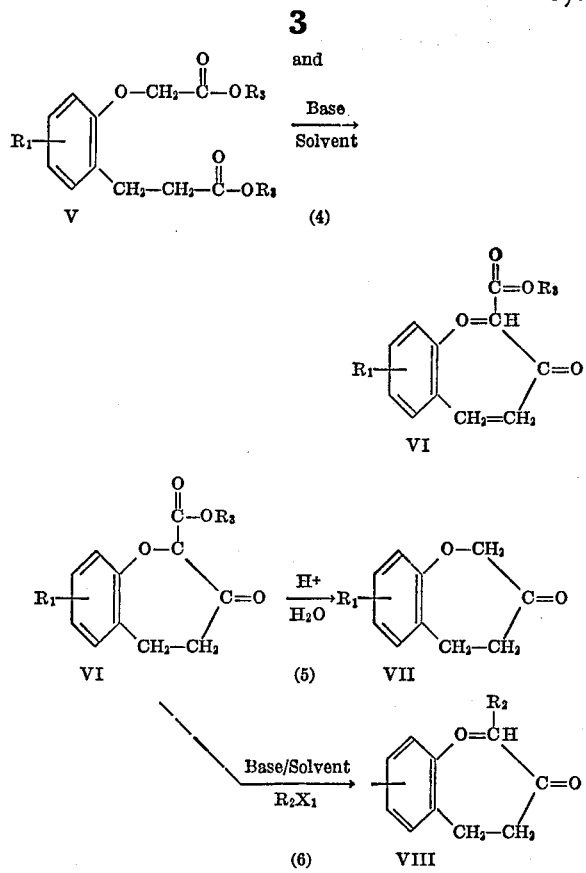

A preferred embodiment of this invention is the process for the preparation of a compound selected from the group conssiting of those having the formula:

were $R_1$, $R_3$ and X are as aforesaid, which comprises reacting a compound of the formula:

where $R_1$, $R_3$ and X are as aforesaid, with a basic reagent selected from sodamide, sodium alkoxide and potassium alkoxide where alkoxide has from 1 to 4 carbon atoms, trialkylamine where alkyl has from 1 to 4 carbon atoms and sodium hydride, in an anhydrous solvent from about 25° C. up to the boiling point of said solvent.

Another preferred embodiment is the process where the aforesaid anhydrous organic solvent is selected from dimethylformamide, tetrahydrofuran, dimethylsulfoxide or ethylene glycol dimethyl ether.

Still another preferred embodiment of this invention is the process for preparing compounds of the formula:

where $R_1$, $R_2$ and X are as aforesaid, which comprises contacting a compound of the formula:

where $R_1$, $R_3$ and X are as aforesaid, with a basic reagent selected from sodamide, sodium alkoxide and potassium alkoxide where alkoxide has from 1 to 4 carbon atoms, trialkylamine where alkyl has from 1 to 4 carbon atoms and sodium hydride; and a compound selected from the group consisting of those having the formula: $R_2$—$X_1$ where $R_2$ is as aforesaid and $X_1$ is selected from chlorine, bromine and iodine in an anhydrous organic solvent from about 25° C. up to the boiling point of said solvent.

Another preferred embodiment of this invention is the aforesaid process wherein the anhydrous organic solvent is dimethylformamide, tetrahydrofuran, dimethylsulfoxide or ethylene glycol dimethyl ether.

A further preferred embodiment is the compound 7-methyl-5,4-dihydro-2H-1,5-benzodioxepin-3-one.

Yet another preferred embodiment is the compound 6-methyl-3,4-dihydro-2H-1,5-benzodioxepin-3-one.

Still another preferred embodiment is the compound 2,7-dimethyl-3,4-dihydro-2H-1,5-benzodioxepin-3-one.

Another preferred embodiment is the compound 3,4-dihydro-2H-1,5-benzodioxepin-3-one.

Still another preferred embodiment is the compound 2,8-dimethyl-3,4-dihydro-2H-1,5-benzodioxepin-3-one.

Another preferred embodiment is the compound 3,4-dihydro-2H-1,5-benzoxepin-3-one.

Another preferred embodiment is the compound 2-methyl-3,4-dihydro-2H-1,5-benzoxepin-3-one.

A further embodiment of this invention is the method for flavoring foods which comprises adding from about 0.0001 to about 0.1% by weight of a compound having the formula:

where $R_1$, $R_2$ and X are as aforesaid.

Another preferred embodiment of this invention is the method for enhancing the odor of perfumes which comprises adding from about 0.0001 to about 1.0% by weight of a compound having the formula:

where $R_1$, $R_2$ and X are as aforesaid, where $R_1$, $R_2$, $R_3$ and X have the meanings defined hereinbefore.

In Step 1, the substituted-catechol-O,O-diacetic acid diester which is conveniently prepared by the procedure of Carter and Lawrence, is reacted with at least a molar equivalent amount, and preferably an excess to ensure complete reaction, of a strong base. On the basis of their availability and convenience in use, a sodium or potassium alkoxide, where alkoxide has from 1 to 4 carbon atoms, sodamide, sodium hydride or a trialkylamine where alkyl has from 1 to 4 carbon atoms are preferred. The reaction is conducted in a reaction-inert solvent that does not contain active hydrogens. Such readily available solvents as tetrahydrofuran, dimethylformamide, dimethylsulfoxide and ethylene glycol dimethyl ether are preferred. The reaction is conducted at temperatures from about 25° C. up to the boiling point of the solvent mixture and under an inert and dry gas atmosphere. Dry nitrogen is particularly convenient. While the order of adding the reactants is not critical, it will be obvious to those skilled in the art, that in exothermic reactions such as this it is preferable to add a solution of one of the reactants slowly to a solution of the second reactant. It is convenient in this reaction to slowly add a solution of the substituted-catechol to a stirred suspension of the basic reagent in the solvent at room temperature and allow the rate of addition to control the reaction temperature. The temperature is allowed to rise to reflux and is refluxed for from 15 minutes to several hours, depending of course on the size of the batch. While the reaction can be conducted at lower temperatures it is not efficient, in turns of reaction time and final yield, to do so. The product (II) is recovered from the reaction mixture after having been cooled to room temperature by pouring into a large volume of ice water and acidifying to a pH of about 2.5. The mixture is extracted with a water-imiscible organic solvent such as diethyl ether, preferably in several portions. The ether portions are combined and dried with a desiccant such as anhydrous sodium sulfate. Evaporation of the ether layer yields product II.

The procedure for obtaining the product VI from the 2-carboalkoxy ethylphenoxyacetic acid ester (V) is identical to that described above.

The 3,4-dihydro-2H-1,5-benzodioxepin-3-one (III) and 3,4-dihydro-2H-1,5 - benzoxepin - 3 - one (VII) compounds are obtained by hydrolyzing the carboalkoxy groups from position 2 of the benzodioxepin and benzoxepin ring systems. The Compounds II and VI are dissolved in a water-miscible organic solvent such as a lower alcohol, and added to a dilute aqueous mineral acid such as 5% aqueous hydrochloric acid or the like. The mixture is heated to reflux and stirred for several hours or longer depending on the size of the batch. After cooling, the mixture is poured into water and extracted with a water-immiscible organic solvent such as diethyl ether. After drying the ether with a desiccant such as anhydrous sodium sulfate, the ether is evaporated. Distillation in vacuo yields the product III or VII.

The 2-substituted-3,4-dihydro-2H-1,5 - benzodioxepin (IV) and 2-substituted-3,4-dihydro-2H - 1,5 - benzoxepin (VIII) are prepared from the carboalkoxy intermediates (II) and VI by reacting them with an alkyl halide in the presence of a strong base selected from those previously described for cyclization of the heterocyclic ring and in one of the aforementioned solvents. While the order of addition of the reactants is not critical, it is convenient to add a molar equivalent amount of the alkyl halide dissolved in the solvent to a stirred mixture of a molar equivalent amount of the base and the 2-carboalkoxy intermediate suspended and dissolved respectively, in the the same solvent. The alkyl halides are those having from 1 to 4 carbon atoms and where halide is chloride, bromide or iodide. The reaction may be conducted at from about 0° C. up to about 100° C. For convenience, the reaction is preferably conducted at room temperature for from about 1 to 3 hours and then raised to the boiling point of the solvent mixture for a further time to ensure completeness of the reaction. The reaction products IV and VIII are recovered in the same manner as described above for the recovery of Compounds III and VII.

It will be obvious to those skilled in the art that the compounds which have alkyl substituents on the benzene ring of the 2-alkyl-benzodioxepin compounds are mixtures of isomers. For example:

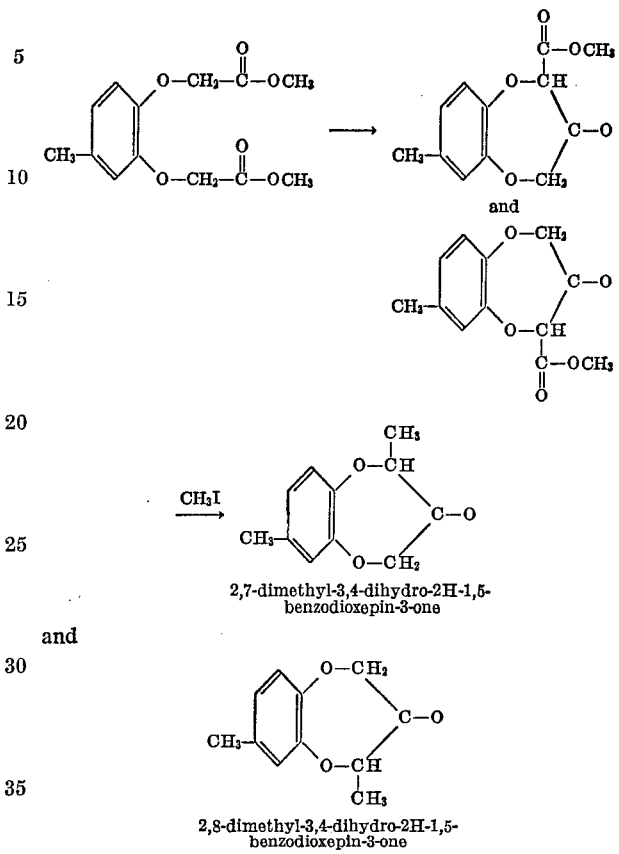

Lack of knowledge of the exact relative proportions of the two products does not affect the utility of the mixtures as flavor and odor agents.

A specific embodiment of the method of this invention as it relates to the flavoring of foods and the odor enhancement of foods and perfumes consists in adding one of the benzodioxepin-3-ones or benzoxepin-3-ones to a food at a level of from about 0.0001 to 0.1% by weight, either by itself, as an alcohol solution or as a water solution. Alternatively, the ketone may be added to foods as a blend of other aromatic chemicals such as methyl ionone, neofoline, methyl heptine carbonate, benzaldehyde, diacetyl, ethyl butyrate, propylene glycol and solvents. The methods of blending the ketone to the other ingredients are known to those familiar with the art. Such methods as blending with a slow speed stirrer are most effective. The exact concentrations of ingredients will depend, of course, on the food and on the preference of the blender. Generally, from about 0.0001 to 0.1 weight percent of the ketones of this invention are preferred, although higher and lower concentrations are effective. While the ketones vary slightly in their volatility and flavor characteristics they all produce a fresh, leafy, watermelon taste and a fruity odor when added to foods at the above-mentioned levels. A noticeable improvement or enhancement in the odor of cosmetics, particularly perfumes, colognes, face creams, toilet powders and the like, is obtained when the "watermelon ketones" of this invention are blended with the aromatic chemicals usually used in the cosmetic art. The aromatic oils and concentrates and their concentration in the blend are usually determined by the perfume blender.

The aromatic chemicals used in blending perfumes are known to those familiar to the art and include orris oil concrete, violet oil concrete, sandalwood oil, ethyl myristinate and many others. When the "watermelon ketones" of this invention are blended with these ingredients, at a level of from about 0.0001 to 1.0 weight percent a distinct leafy or fresh effect is obtained. The improvement in odor or bouquet is most evident when the "watermelon ketones" are used in violet leaf perfumes or perfumes extracts.

EXAMPLE I 7-methyl-3,4-dihydro-2H-1,5-benzodioxepin-3-one

To a stirred suspension of 31.7 grams (1.32 moles) of sodium hydride in 900 ml. dry ethylene glycol dimethyl ether is added under a nitrogen atmosphere, a solution of 161 grams (0.6 mole) of dimethyl 4-methylcatechol, O,O-diacetate in 900 ml. of dry ethylene glycol dimethyl ether over a 3-hour period. As the addition proceeds, the reaction temperature rises and is held at reflux by adjusting the rate of addition. At the end of the addition, the reaction is refluxed for 30 minutes, cooled to room temperature and poured into 6 liters of ice water. The resulting suspension is acidified to ph 2.5 and extracted with four liter portions of ether. The combined ether layers are washed with 500 ml. of water and dried over anhydrous sodium sulfate. Evaporation of the ether in vacuo provides 134.5 grams (95%) of the crude esters; B.P. 141–143° C. (1 mm. Hg). I.R. spectra/ $ChCl_3$ maxima: 5.63, 5.72 $\mu$; N.M.R./$COCl_3$=2.25 (3H, singlet), 3.85 (3H, singlet), 4.69 (2H, multiplet), 5.33 (1H, singlet), 6.88 (3H, multiplet) p.p.m.

A solution of 126 grams (0.534 mole) of the crude esters, 7- and 8-methyl-2-carbomethoxy-3-oxo-3,4-dihydro-2H-1,5-benzodioxepin in 325 ml. of ethanol and 325 ml. of 5% hydrochloric acid is stirred at reflux temperature for 8 hours. The solution is poured into 1 liter of water and extracted with five 200 ml. portions of ethyl ether. Evaporation of the ether followed by distillation provides 88 grams (93%) of 7-methyl-3-oxo-3,4-dihydro-2(H)-1,5-benzodioxepin; B.P. 88–91° C. (0.7 mm. Hg); infrared max./$CHCl_2$, 5.72 $\mu$; N.M.R./$COCl_3$=2.27 (3H, singlet); 4.68 (3H, singlet); 6.83 (3H, multiplet) p.p.m.

*Analysis.*—Calcd. for $C_{10}H_{14}O_3$ (percent): C, 65.91; H, 7.74. Found (percent): C, 65.73; H, 7.82.

EXAMPLE II

The products of Table I are prepared by the procedure of Example I from the appropriate starting material.

TABLE I

Starting material / Product

| $R_1$ | Substituted-3,4-dihydro-2H-1,5-benzodioxapin-3-one |
|---|---|
| 4-methyl or 5-methyl | 7-methyl. |
| 4-ethyl or 5-ethyl | 7-ethyl. |
| 4-isopropyl or 5-isopropyl | 7-isopropyl. |
| 4-tertiarybutyl or 5-tertiarybutyl | 7-tertiarybutyl. |
| 4-n-butyl or 5-n-butyl | 7-n-butyl. |
| H— | H—. |
| 3-methyl | 6-methyl. |
| 3-isopropyl | 6-isopropyl. |

EXAMPLE III 7-methyl-3,4-dihydro-2H-1,5-benzoxepin-3-one

To a stirred suspension of 50.8 grams (1.3 moles) of sodamide in 900 ml. of dry tetrahydrofuran is added, under a nitrogen atmosphere, a solution of 150 grams (0.6 mole) of 2 - (2 - carbomethoxymethyl-4-methylphenoxyacetic acid methyl ester in 900 ml. of tetrahydrofuran over a three-hour period. The reaction temperature rises and is held at reflux. At the end of the addition, the reaction is refluxed for an additional 30 minutes, then cooled to room temperature and poured into 6 liters of ice water. The resulting suspension is acidified to pH 2.5 and extracted with four 1-liter portions of ether. The combined ether layers are washed with 500 ml. of water and dried over anhydrous sodium sulfate. Evaporation of the ether provides 7-methyl-2-carbomethoxy-3,4-dihydro-2H-1,5-benzoxepin-3-one.

The crude ester mixture is stirred for 8 hours in a mixture of 325 ml. of ethanol and 325 ml. of 5% aqueous hydrochloric acid at reflux. The solution is poured into 1 liter of water and extracted with five, 200 ml. portions of ethyl ether. Evaporation of the ether followed by distillation provides 7-methyl-3,4-dihydro-2H-1,5-benzoxepin-3-one.

When dimethylformamide, dimethylsulfoxide, ethylene glycol dimethyl ether are substituted for tetrahydrofuran solvent in this reaction, equivalent yields of product are obtained.

When sodium hydride, sodium methoxide, sodium ethoxide, potassium methoxide and potassium ethoxide, sodium butoxide or potassium butoxide are substituted for sodamide in this reaction, equivalent yields of product are obtained.

EXAMPLE IV

The products of Table II are prepared by the procedure of Example III from the appropriate starting material.

TABLE II

Starting material / Product

| $R_1$ | Substituted-3,4-dihydro-2H-1,5-benzoxepin-3-one |
|---|---|
| 4-methyl | 7-methyl. |
| 3-ethyl | 6-ethyl. |
| 4-n-propyl | 7-n-propyl. |
| 3-isopropyl | 6-isopropyl. |
| 4-tertiarybutyl | 7-tertiarybutyl. |
| 3-n-butyl | 6-n-butyl. |
| H— | H—. |
| 6-methyl | 9-methyl. |
| 5-ethyl | 8-ethyl. |

EXAMPLE V 2-methyl-3,4-dihydro-2H-1,5-benzodioxepin-3-one

To a mixture of 22.2 grams of methyl 3-oxo-3,4-dihydro-2H-1,5-benzodioxepin - 2 - carboxylate, prepared from catechol, O,O-diacetate by the procedure of Example I, 5.5 grams of sodium methoxide and 400 ml. of ethylene glycol dimethyl ether was added with stirring a solution of 17.0 grams of methyl iodide in 50 ml. of ethylene glycol dimethyl ether. The reaction was stirred for two hours at 25° C. and then at reflux for 1 hour. The mixture was poured into 1 liter of water and acidified with concentrated hydrochloric acid. After stirring at reflux for 16 hours, the suspension was extracted four times with 200 ml. portions of ether. The combined ether layers were dried over anhydrous sodium sulfate and evaporated in vacuo to give 16 grams of crude product. Distillation provided 13.5 grams of product, B.P. 85–91° C. (0.6 mm. Hg); infrared max./$CHCl_3$, 5.72 $\mu$.

When sodamide, trimethylamine, tri-n-butylamine, sodium butoxide, sodium ethoxide, potassium methoxide, potassium butoxide or sodium hydride are substituted for sodium methoxide in this reaction, equivalent yields of product are obtained.

When solvents such as dimethylformamide, tetrahydrofuran, and dimethylsulfoxide are substituted for ethylene glycol dimethyl ether in this reaction, equivalent yields of product are obtained.

EXAMPLE VI 7-methyl-2-n-butyl-3,4-dihydro-2H-1,5-benzodioxepin-3-one 8-methyl-2-n-butyl-3,4-dihydro-2H-1,5-benzodioxepin-3-one To a solution of 2.6 grams sodium hydride in 100 ml. of dry dimethylformamide was added 25.6 grams of a mixture of 7- and 8 - methyl-2-carbomethoxy-3-oxo-3,4-dihydro - 2H - 1,5 - benzodioxepin prepared according to Example I. The solution was stirred for ten minutes and treated with 15 grams of n-butyl bromide in 30 ml. dimethylformamide. The solution was stirred for 30 minutes and then heated on a steam bath for two hours. After cooling, it was poured into 1 liter of 5% aqueous hydrochloric acid and the resulting mixture was stirred and heated for 12 hours at 100° C. The product was recovered by ether extraction to provide, after distillation, 14 grams of a mixture of 7- and 8 - methyl - 2 - butyl-3,4-dihydro-2H-1,5-benzodioxepin-3-one, B.P. 92–91° C. (0.2 mm. Hg); infrared max./CHCl$_3$, 5.72 μ.

EXAMPLE VII

The products of Table III are prepared by the procedure of Example VI from the starting materials.

ring at reflux for 16 hours, the suspension is extracted four times with 200 ml. portions of ether. The combined ether layers are dried over anhydrous sodium sulfate and evaporated in vacuo to give 2,7-dimethyl-3,4-dihydro-2H-1,5-benzoxepin-3-one.

EXAMPLE IX

When 0.0001 gram of 3,4-dihydro-2H-1,5-benzoxepin-3-one is added to 100 grams of unflavored gelatin and the mixture is added to one quart of boiling water, stirred for 5 minutes and then allowed to cool to room temperature, a gelled food is obtained that possesses a pleasant watermelon taste and odor.

Similarly, when 0.1 gram of 3,4-dihydro-2H-1,5-benzoxepin-3-one is added to 100 grams of unflavored gelatin and the mixture is added to one quart of boiling water, stirred for 5 minutes and then allowed to cool to room temperature, a pleasant tasting gel is formed that has a watermelon taste and odor.

EXAMPLE X

The benzoxepin compounds of Table IV are prepared by the procedure of Example VIII from the starting materials and alkyl halides listed.

TABLE III

| Starting Material | Alkyl Halide | Product | |
|---|---|---|---|
| R$_1$ | R$_2$X | R$_1$ | R$_2$ |
| H– | – | H– | Methyl. |
| 6- and 9-methyl | Methyl chloride | 6- and 9-methyl | Ethyl. |
| 7- and 8-methyl | Ethyl chloride | 7- and 8-methyl | Ethyl. |
| 7- and 8-n-propyl | Methyl iodide | 7- and 8-n-propyl | Methyl. |
| 6- and 9-isopropyl | n-Butyl bromide | 6- and 9-isopropyl | n-Butyl. |
| 6- and 9-n-butyl | Isopropyl chloride | 6- and 9-n-butyl | Isopropyl. |
| 6- and 9-sec. butyl | tert.Butyl bromide | 6- and 9-sec.butyl | tert.Butyl. |
| 7- and 8-tert.butyl | n-Propyl iodide | 7- and 8-tert.butyl | n-Propyl. |

EXAMPLE VIII 2,7-dimethyl-3,4-dihydro-2H-1,5-benzoxepin-3-one

To a stirred suspension of 50.8 grams (1.3 moles) of sodium ethoxide in 900 ml. of dry dimethyl sulfoxide, is added under a nitrogen atmosphere, a solution of 150 grams (0.6 mole) of 2-(2-carbomethoxy ethyl)-4-methylphenoxyacetic acid methyl ester in 900 ml. of dimethylsulfoxide over a three-hour period. The temperature rises during the addition and is held at reflux. At the end of the addition the reaction is refluxed for an additional 30 minutes and is then cooled to room temperature and poured into 6 liters of ice water. When the resulting suspension is acidified to pH 2.5, extracted with ether, washed with water, dried with anhydrous sodium sulfate and the ether is evaporated, 7-methyl-2-carbomethoxy-3-oxo-3,4-dihydro-2H-1,5-benzoxepin is obtained.

A solution of 17 grams of methyl iodide in 50 ml. of ethylene glycol dimethyl ether is added to a mixture of the crude ester, 5.5 grams of sodium methoxide and 400 ml. of ethylene glycol dimethyl ether. The mixture was stirred at 25° C. for 2 hours and then allowed to reflux for 1 hour. The mixture is poured into 1 liter of water and acidified with concentrated hydrochloric acid. After stir-

TABLE IV

| Starting material | Alkyl halide | Product | |
|---|---|---|---|
| R$_1$ | R$_2$X | R$_1$ | R$_2$ |
| 6-methyl | Methyl iodide | 6-methyl | Methyl. |
| 6-methyl | Isopropyl iodide | 6-methyl | Isopropyl. |
| 7-methyl | Methyl chloride | 7-methyl | Methyl. |
| 8-methyl | Ethyl chloride | 8-methyl | Ethyl. |
| 6-n-butyl | n-Butyl bromide | 6-n-butyl | n-Butyl. |
| 6-isobutyl | n-Butyl bromide | 6-iso-butyl | n-Butyl. |
| 7-tert,butyl | Isobutyl iodide | 7-tert,butyl | Isobutyl. |
| 9-methyl | Methyl chloride | 9-methyl | Methyl. |
| 9-n-butyl | Methyl chloride | 9-n-butyl | Methyl. |

EXAMPLE XI

A synthetic, watermelon flavor was prepared with a watermelon ketone from those in Table V. Each of the ketones was formulated with the auxiliary chemicals to obtain the watermelon-flavored extract at a level of 0.001 and at 0.1 weight percent.

The extracts gave a fruitful watermelon flavor at a level of 200 p.p.m. when added to a non-carbonated soft drink, made from 14 g., sugar, 0.05 g. citric acid and 100 g. water.

TABLE V

| Auxillary chemicals: | Weight (grams) |
|---|---|
| Methyl ionone | 0.010 |
| Neofoline | 0.010 |
| Methyl heptine carbonate | 0.002 |
| Benzaldehyde | 0.020 |
| Diacetyl | 0.040 |
| Ethyl butyrate | 0.060 |
| Propylene glycol | 8.790 |
| Watermelon ketone | 0.060 |
| Total | 10.0 |

Watermelon ketone:

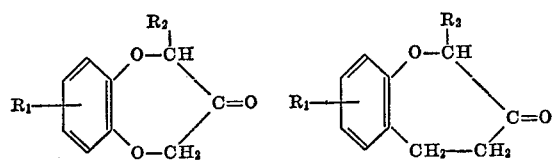

| $R_1$ | $R_2$ | $R_1$ | $R_2$ |
|---|---|---|---|
| H | H | H | H |
| H | $CH_3$ | H | $CH_3$ |
| H | $C_2H_5$ | H | $C_2H_5$ |
| H | $n\text{-}C_3H_7$ | H | $n\text{-}C_3H_7$ |
| H | $n\text{-}C_4H_9$ | H | $n\text{-}C_4H_9$ |
| H | $iso\text{-}C_3H_7$ | H | $iso\text{-}C_3H_7$ |
| H | $iso\text{-}C_4H_9$ | H | $iso\text{-}C_4H_9$ |
| H | $tert.\text{-}C_4H_9$ | H | $tert.\text{-}C_4H_9$ |
| 7-$CH_3$ | H | 7-$CH_3$ | H |
| 7-$CH_3$ | $n\text{-}C_4H_9$ | 6-$C_2H_5$ | $n\text{-}C_4H_9$ |
| 7-,8-$CH_3$ | $iso\text{-}C_3H_7$ | 7-$n\text{-}C_3H_7$ | $iso\text{-}C_3H_7$ |
| 7-,8-$C_2H_5$ | $CH_3$ | 7-$iso\text{-}C_3H_7$ | H |
| 7-,8-$n\text{-}C_4H_9$ | $CH_3$ | 7-$tert.\text{-}C_4H_9$ | H |
| 6-,9-$CH_3$ | $CH_3$ | 9-$CH_3$ | $n\text{-}C_4H_9$ |
| 6-,9-$iso\text{-}C_3H_7$ | $iso\text{-}C_3H_7$ | 8-$C_2H_5$ | $iso\text{-}C_3H_7$ |
| 6,9-$CH_3$ | H | 6-$CH_3$ | $CH_3$ |

EXAMPLE XII

A green vegetable effect that resembles the odor and taste of green snap beans and that of cucumbers is obtained when 1.0 weight percent of the watermelon ketones of Table V, Example XI are formulated with the auxiliary chemicals of Table VI and blended for 48 hours. The resulting liquid flavor imparts a distinct fresh taste when added to pre-cooked snap beans at a 70 p.p.m. level.

TABLE VI

| Ingredients: | Wt. percent, grams |
|---|---|
| Hexenal | 1.50 |
| Methyl heptine carbonate | .10 |
| Propylene glycol | 96.90 |
| Oil clarysage french | 0.50 |
| Watermelon ketone | 1.0 |
| | 100.0 |

EXAMPLE XIII

A synthetic otto violet leaf extract was prepared with the ingredients of Table VII using the watermelon ketones of Example XI. The extract at a level of 1000 p.p.m. was added to toilet powder and gave a leafy effect to the odor of the powder.

TABLE VII

| Extract: | Grams |
|---|---|
| Ionone alpha | 55.0 |
| Methyl heptine carbonate | 0.5 |
| Sandalwood oil | 10.0 |
| Orris oil concrete | 4.0 |
| Ethyl myristinate | 1.0 |
| Guaiac wood oil | 14.0 |
| Watermelon ketone | 0.5 |
| Violet leaf concrete | 15.0 |
| Ethyl alcohol | 10.0 |
| | 100.0 |

| Toilet powder: | Grams |
|---|---|
| Talcum | 40.0 |
| Kaolin | 25.0 |
| Zinc stearate | 15.0 |
| Magnesium carbonate | 10.0 |
| Zinc oxide | 10.0 |
| Extract | 0.1 |
| | 100.0 |

EXAMPLE XIV

When the perfume extract of Example XIII is further diluted with ethyl alcohol so that the concentration of watermelon ketone is reduced from 5000 p.p.m. (0.5%) to 1.0 p.p.m. (0.0001%), a perfume having a fresh, leafy bouquet is obtained.

Similarly, when the concentration of watermelon ketone in the extract of Example XIII is increased to 1% by reducing the amount of ethyl alcohol to 9.5 grams and adding a further 0.5 gram of watermelon ketone, a heavier leafy bouquet is obtained from the extract.

What is claimed is:

1. The method for enhancing the odor of perfumes which comprises adding thereto from about 0.0001 to about 1.0% by weight of a compound having the formula

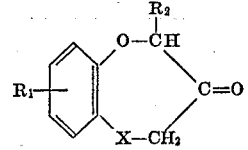

wherein $R_1$ and $R_2$ are each selected from the group consisting of hydrogen and alkyl having from 1 to 4 carbon atoms and X is selected from the group consisting of oxygen and methylene.

2. The method according to claim 1 wherein the compound is 7-methyl-3,4-dihydro-2H-1,5-benzodioxepin-3-one.

3. The method according to claim 1 wherein the compound is 2-methyl-3,4-dihydro-2H-1,5-benzodioxepin-3-one.

4. The method according to claim 1 wherein the compound is 3,4-dihydro-2H-1-benzoxepin-3-one.

References Cited
UNITED STATES PATENTS

| 3,144,467 | 8/1964 | Houlihan | 252—522 |
| 3,594,195 | 7/1971 | Tate et al. | 252—522 |

SAM ROSEN, Primary Examiner